United States Patent [19]
Fredmonski et al.

[11] Patent Number: 5,408,747
[45] Date of Patent: Apr. 25, 1995

[54] COMPACT RADIAL-INFLOW TURBINES

[75] Inventors: Adam J. Fredmonski; Frank W. Huber, both of Palm Beach Gardens, Fla.

[73] Assignee: United Technologies Corporation, Hartford, Conn.

[21] Appl. No.: 227,439

[22] Filed: Apr. 14, 1994

[51] Int. Cl.$^6$ .................................................. B23P 1/08
[52] U.S. Cl. ........................................ 29/889; 29/889.7
[58] Field of Search ............................... 29/889, 889.7

[56] References Cited

U.S. PATENT DOCUMENTS

| | | |
|---|---|---|
| 4,985,992 | 1/1991 | Vosgien ............................ 29/889.7 |
| 5,061,154 | 10/1991 | Kington .............................. 29/889 |

*Primary Examiner*—John T. Kwon
*Attorney, Agent, or Firm*—Norman Friedland

[57] ABSTRACT

The contour and dimensions of the radial-inflow turbine is obtained by an iteration process that includes calculating by use of a three dimensional fluid dynamic flow analysis the parameters that will produce the desired fluid flow velocities, pressures and other aerodynamic properties until the optimum configuration is obtained. The wrap distribution is obtained in accordance with the formulae:

When $0.0 < X < 0.22135$: $\delta\theta/\delta\theta(\text{total}) = 0.0$

When $0.22135 < X < 1.00$: $\delta\theta/\delta\theta(\text{total}) = A + B \times X + C \times X^2 + D \times X^3 + E \times X^4 + F \times X^5 = 0.0$ Where:
$\delta\theta/\delta\theta(\text{total}) =$ local normalized wrap angle
$A = 0.101596$
$B = -1.007604$
$C = 2.672787$
$D = -1.0125510$
$E = 0.713005$
$F = -0.469075$
$X =$ non-dimensional axial chord for a given configuration Additional reduction in size and inertia is obtained by leaning and contouring the leading edge into an elliptical shape.

6 Claims, 6 Drawing Sheets

COMPACT RADIAL-INFLOW TURBINES

TECHNICAL FIELD

This invention relates to radial-inflow turbines and in particular to a compact radial-inflow turbine and method of obtaining size and inertia reduction without sacrificing performance.

BACKGROUND ART

As is well known in this technology, the design of radial-inflow turbines relies primarily upon general empirical guidelines developed from previous successful designs and experience gained in the field. These guidelines dictate the sizing of the flowpath, blade tip diameter, rotor axial length, blade number and blade shape. The disadvantage of this approach is that resulting designs generally feature relatively low aerodynamic loadings, are heavy and have high rotational inertia. The relative mass of the turbine generally leads to increased disk bore stresses which limit the turbine's life, and restrict the turbine from operating at high tip speeds that would ordinarily be required for advanced applications.

Traditional radial-inflow turbine blades are developed by axially stacking a number of two dimensional cross-sections which satisfy thickness requirements and are set at various wrap angles. The disadvantage of this blade generation method is that the airfoil's surface is not developed in the streamwise direction. As a result, surface contours and curvatures may not be smooth and continuous.

AIAA Publication AIAA-91-2127 entitled "DESIGN AND EXPERIMENTAL EVALUATION OF COMPACT RADIAL-INFLOW TURBINES, by A. J. Fredmonski, F. W. Huber (co-inventors of this patent application), R. J. Roelke and S. Simonyi presented at the joint AIAA/SAE/ASME/ASMEE 26TH Joint Propulsion Conference discloses a radial-inflow turbine that has been designed using a multi-stage three-dimensional (3-D) Euler solver. The Euler solver allows the aerodynamic design of the airfoil of the turbine and according to this paper the design had a 40% less rotor length than current traditionally-sized radial turbines. To achieve this size reduction a unique calibrated 3-D multi-stage Euler code (not discloses in this paper) was devised and applied to accurately predict and control the high rotor flow passage velocities and high aerodynamic loadings resulting from the reduction in rotor length. The objective of the paper was to compare the advanced design to current state-of-the-art configurations.

Absent from this paper are the parameters, dimensions and the methodology that are necessary to arrive at a design of the radial-inflow turbine. The codes are a result of fully three-dimensional computational fluid flow dynamics and techniques and are necessary to arrive at a significant size reduction and maintain high performance. In order to arrive at the codes, a compilation of airfoils are computed and analyzed aerodynamically in order to generate curves in non-dimensional values that exhibit the necessary wrap distribution. This invention teaches the method of designing the rotor's wetted surface of a radial-inflow turbine by utilizing a predetermined wrap distribution and relating it to the aerodynamic flowfield, such that the rotor maintains high aerodynamic performance. The reduction in size, the reduction in inertia and the high aerodynamic performance are attributed to the rotor's predetermined wrap distribution and leading edge shape obtained from prescribed, normalized relations.

SUMMARY OF THE INVENTION

An object of this invention is to provide an improved radial-inflow turbine characterized by its reduction in size, reduction in inertia without deficit in turbine performance.

A feature of this invention is the method of designing the working surface of the radial-inflow turbine with prescribed wrap angle and leading edge relations.

A feature of this invention is the utilization of a non-dimensional wrap distribution where the formula of the non-dimension relationship is described as:

$\delta\theta/\delta\theta$(total)$=0.0$ when 0.0 is less than X, X is less than 0.22135; and, $\delta\theta/\delta\theta$(total)$=A+[B\times X]+[C\times X^2]+[D\times X^3]+[E\times X^4]+[F\times X^5]$; when 0.22135 is less than X, X is less than 1.00; and where, $\delta\theta/\theta\theta=$local normalized wrap angle and $A=0.101596$; $B=-1.007604$; $C=2.672787$; $D=-1.012510$; $E=0.713005$ and $F=-0.469075$; and where $\delta=$differential; $x=$multiplication; and $\theta$ is a function of the wrap angle and X is a fraction of the axial chord ($X=x/bx$).

Another feature of this invention is to provide in a compact radial-inflow turbine rotor utilizing prescribed wrap angle and leading edge relations where the leading edge is shaped as an ellipse having an ellipse ratio of generally 3:1 and is canted off of a radial line of the turbine to equal, more or less, 20 degrees. The elliptical definition is faired into the rotor's basic suction and pressure surfaces in a smooth manner.

The foregoing and other features of the present invention will become more apparent from the following description and accompanying drawings.

BRIEF DESCRIPTION OF DRAWINGS

FIG. 1A is a top view of the schematic view on FIG. 1 also depicting the terminology;

FIG. 1B is an aft view of FIG. 1 in relationship to the common center line also depicting the terminology;

BEST MODE FOR CARRYING OUT THE INVENTION

Figure 1:
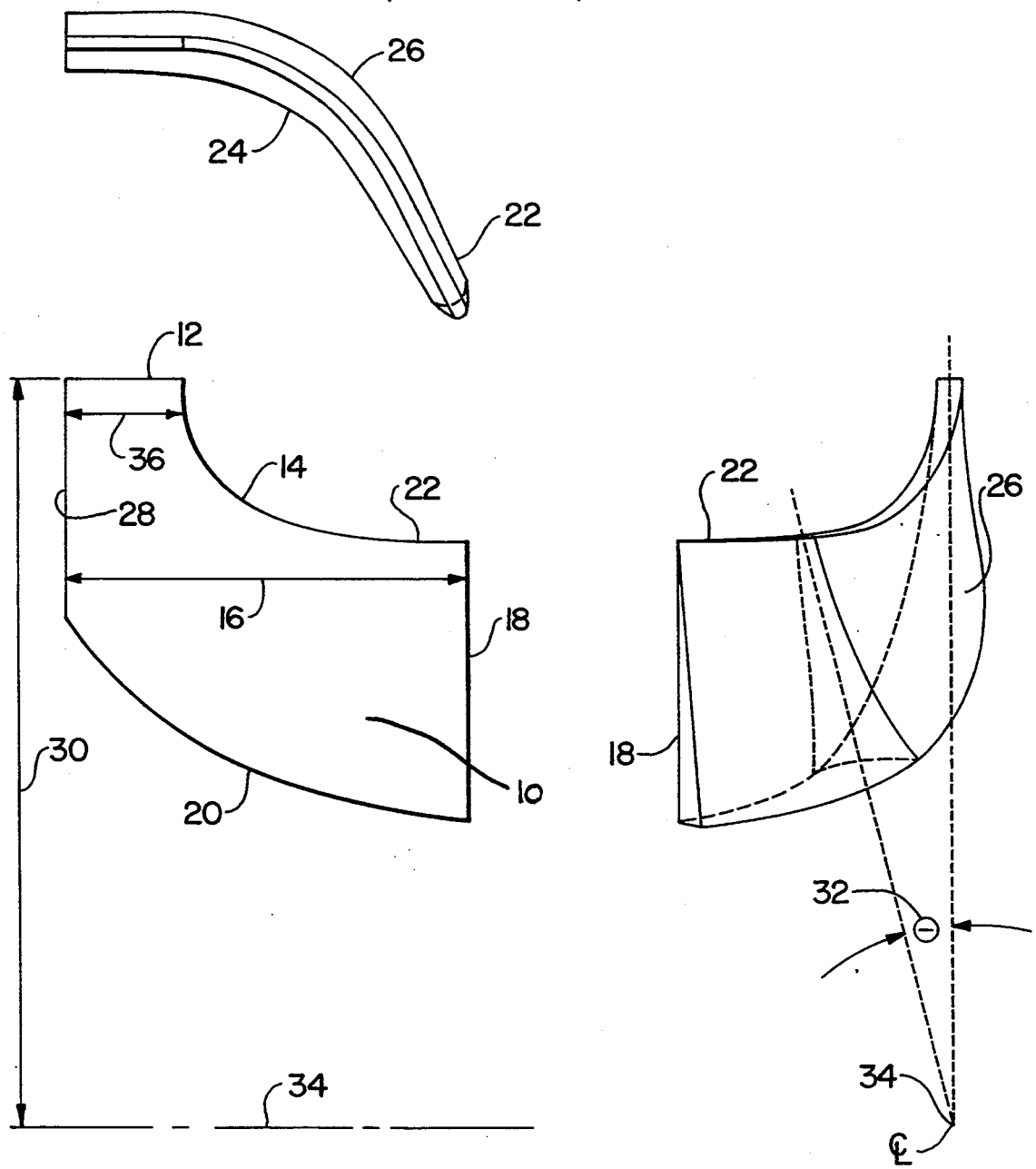
FIG. 1 is a schematic view in elevation of the radial inflow turbine for purposes of applying the terminology to the various portions.

While this invention in its preferred embodiment uses codes obtained from 3-dimensional dynamic fluid flow analyses that are preascertained and include non-dimensional numerical values, it is to be understood that these values are generalized and as one skilled in the art will appreciate slight variations from these values are contemplated without departing from the scope of this invention. For the purpose of describing this invention the following terminology and the following definition will be used throughout the description of this invention.

With reference to all the Figs the following traditional terminology is used to describe radial-inflow turbine rotors:

| Reference Numeral | Terminology |
| --- | --- |
| 10 | radial-inflow turbine rotor |
| 12 | tip leading edge |
| 14 | shroud contour |
| 16 | axial chord length |
| 18 | exducer trailing edge |
| 20 | hub contour |
| 22 | rotor blade |
| 24 | pressure surface |
| 26 | suction surface |
| 28 | backface |
| 30 | rotor |
| 32 | wrap angle $\theta$ |
| 34 | center line |
| 36 | tip width |

Definitions $\delta$ = differential
$\theta$ = wrap distribution
$\eta$ = efficiency
$x/bx$ = non-dimensional axial chord or length
$\theta$ = wrap angle
$g$ = force/mass conversion constant, 32.174 [pounds$_{(mass)}$-foot]/pounds$_{(force)}$-seconds$^2$
$J$ = Joule constant, 778.26 foot/pounds$_{(force)}$/British Thermal Units (BTU)
$\delta h$ = Specific work expressed as BTU/pound$_{(mass)}$
$U_{TIP}$ = Tip speed expressed as feet/second As noted in FIGS. 1, 1A and 1B, the rotor elevation is described by establishing the axial chord or length 16, tip radius (the dimension extending from the center line 34 to the tip 12) and the shroud contour 14. The blade surfaces (suction surface 26 and pressure surface 24) are derived by imposing thickness (based on stress criteria) onto the radial blade elements which follow some wrap distribution and adding details which describe the leading edge 12 and trailing edge 18.

The description presented immediately herein below describes the details of the wrap distribution and the leading edge which are utilized to obtain rotor size reduction and inertia reduction while maintaining high aerodynamic performance.

Figure 3:
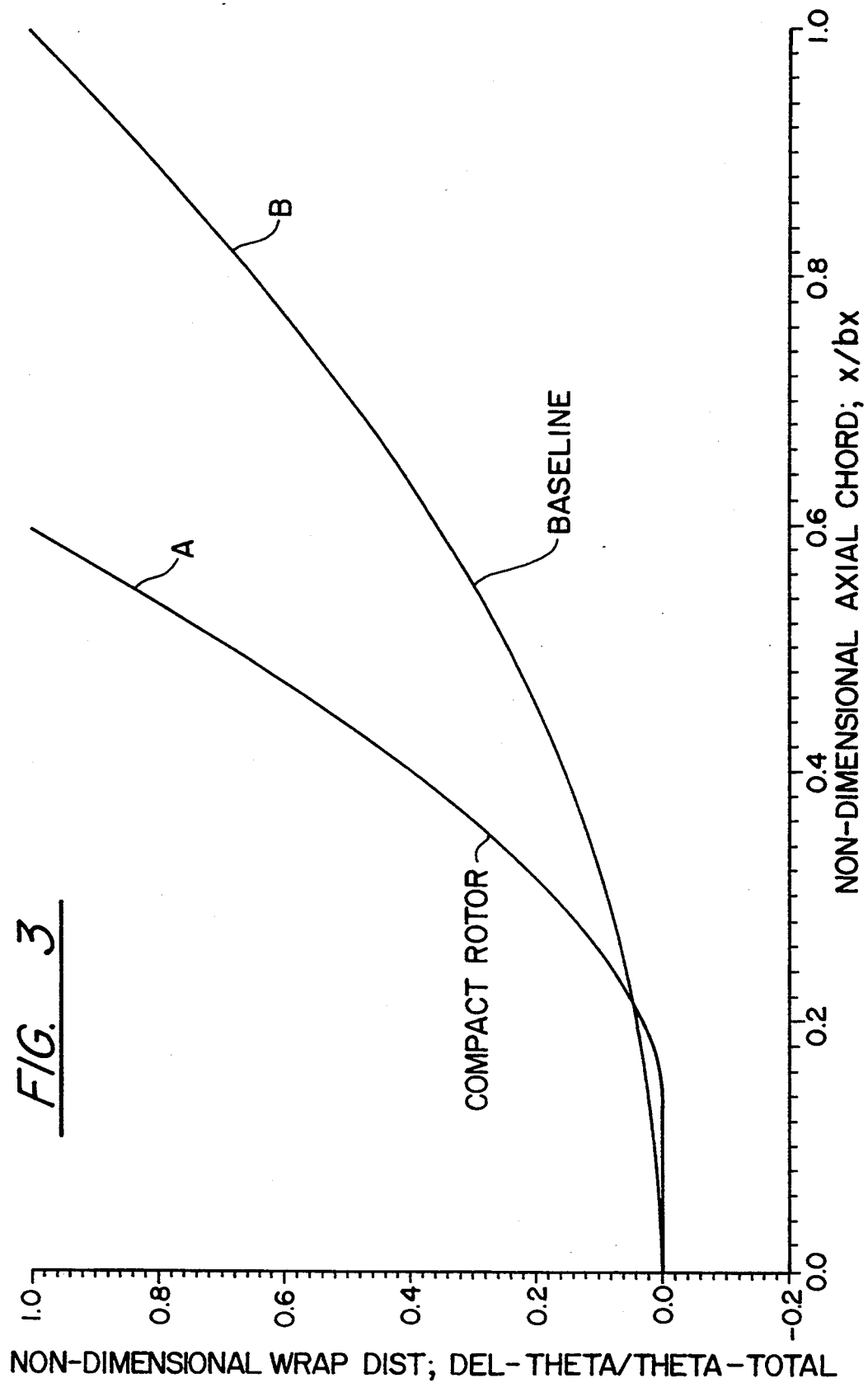
FIG. 3 is a graph plotting the non-dimensional wrap distribution ($\delta\theta/\delta\theta$-total) vs. Non-dimensional axial chord (x/bx)

Referring next to FIG. 3 which is a graphical representation of the non-dimensional wrap distribution used for compact radial-inflow turbine rotor design. To better understand this invention the inventive compact radial-inflow turbine is compared with a baseline, conventionally-sized prior art rotor and demonstrates a better than 40% reduction of axial chord without adversely impacting performance.

In accordance with this invention, the largest rate-of-change in wrap angle is located and concentrated near the side of the shroud contour 14 adjacent to the tip width 36. This provides the largest axial chord reduction as between this location and the rotor's tip radius. The wrap distribution for the radial-impact turbine of this invention is presented in the graph depicted in FIG. 3 which is illustrated for two purposes. First, it describes a curve that can be normalized for designing the wrap angle for any sized compact radial-impact turbine of this invention. And second, it compares a given sized configuration of this invention with a baseline, conventionally-sized prior art rotor (state-of-the-art rotor) normalized for like comparison as represented by curve B.

The wrap distribution of the curve labeled A describes the present invention and the curve labeled B represents the baseline of a conventional-sized rotor. In this comparison the baseline rotor represented by B is sized for a 1.0 non-dimensional axial chord, namely x/bx. The compact rotor represented by curve A is generated by iterations of curves selected to produce the optimum configuration as calculated by well known three dimensional fluid dynamic flow analysis. While this calculation can be computed by hand, it is obviously quicker and less cumbersome by using an electronic digital computer as, for example, the multi-stage three-dimensional Euler solver. The curve A is originally generated intuitively and then analyzed for fluid flow velocities, pressures and other aerodynamic properties by the above mentioned well known fluid flow analyses and then evaluated for its effectiveness. It is presumed that the initial curve would not produce the ultimate effectiveness so that another curve based on the results of the original curve is generated. This curve is similarly analyzed by these fluid flow analysis and its effectiveness is calculated and compared with the previous curve. This procedure is continued until the best or ultimate design is obtained.

Figure 2:
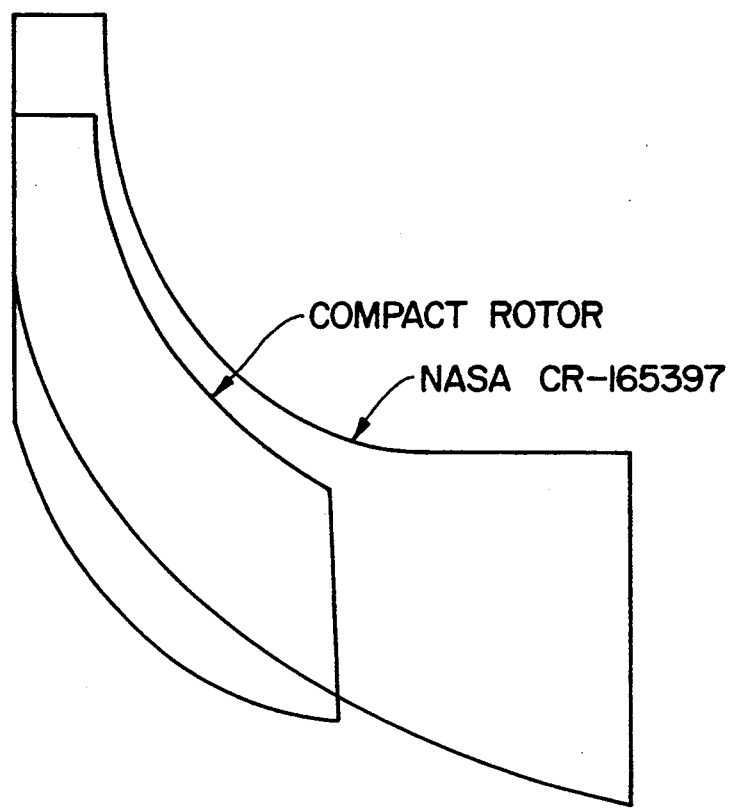
FIG. 2 is a schematic overlay view of a NASA scale version (the smallest of three Baseline Rotors) identified as NASA CR-165397 and the compact rotor of this invention to demonstrate the size comparison.

Curve B is the wrap distribution of a prior art configuration that has been normalized so that it can be compared on equal footing with Curve A. As is apparent from the foregoing with both rotors normalized to the same criteria in terms of non-dimensional wrap distribution and axial chord, the length of the chord can then be compared. In this instance, as is noticeable in FIG. 3, the compact radial-inflow turbine rotor 10 represents a 40% axial chord reduction. This reduction is demonstrated in FIG. 2 which is a comparison between the radial-inflow turbine designed in accordance with this invention and a NASA airfoil that is scaled to the same parameters as was used in the inventive rotor. The airfoil selected as representative of the smallest of three baseline rotors used for relative size comparisons is NASA CR165397. It is quite apparent from viewing FIG. 2 where the radial-inflow turbine rotor of this invention (compact rotor) overlies the NASA rotor that there is a significant reduction in size over the prior art rotor.

As was mentioned above the judicial distribution of wrap is one way to reduce the size and inertia of the radial-inflow rotor. The wrap distribution for radial-inflow rotor 10 is described as follows:

(a) For the case when $0.0 < X < 0.22135$:
$\delta\theta/\delta\theta(\text{total}) = 0.0$ (b) For the case when $0.22135 < X < 1.00$:
$\delta\theta/\delta\theta(\text{total}) = A + B \times X + C \times X^2 + D \times X^3 + E \times X^4 + F \times X^5$ Where:

$\delta\theta/\delta\theta$(total) = local normalized wrap angle
A = 0.101596
B = −1.007604
C = 2.672787
D = −1.012510
E = 0.713005
F = −0.469075
X = local normalized axial ordinate (see FIG. 3)

These values may be varied ±0.001.

Figure 4:
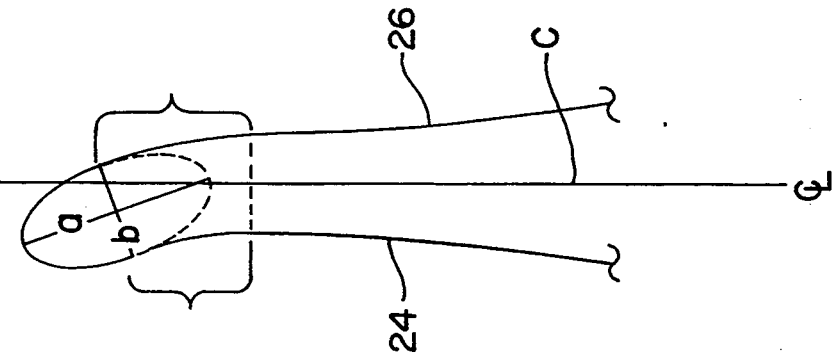
FIG. 4 is a schematic view illustrating the contoured leading edge shape.

According to this invention additional reduction in size and inertia is obtainable by reducing the rotor's tip radius. To achieve the proper reduction in the rotor's radius reference should be made to FIG. 4 which shows the leading edge 12 which is leaned and contoured into an elliptical shape. As noted the major axis a is substantially 3 times larger than the minor axis b thus giving an ellipse ratio of substantially 3:1 and canted off of a radial line c by substantially 20 degrees. This elliptical definition of leading edge 12 is faired into the suction surface 26 and the pressure surface 24 as shown in FIG. 4. This serves to desensitize the rotor to adverse aerodynamic performance impacts.

Figure 5:
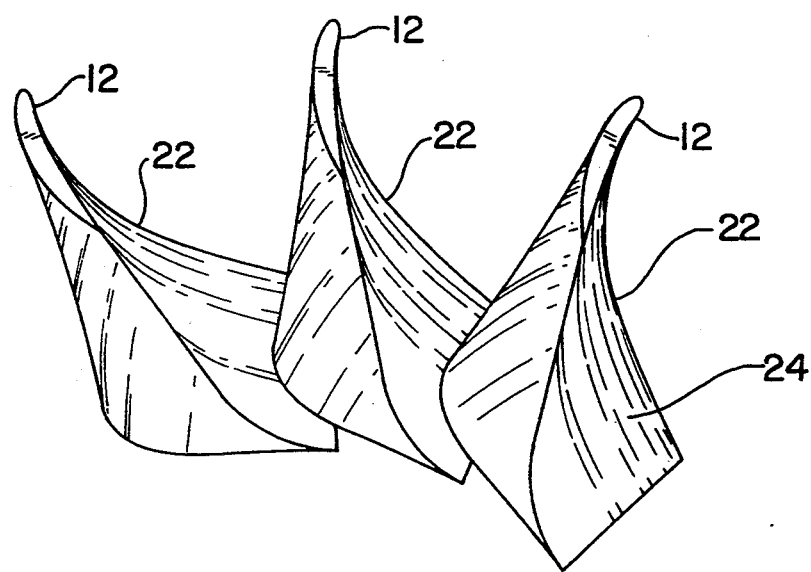
FIG. 5 is a partial developed front view of three blades of this invention viewing the pressure surface.
Figure 5A:
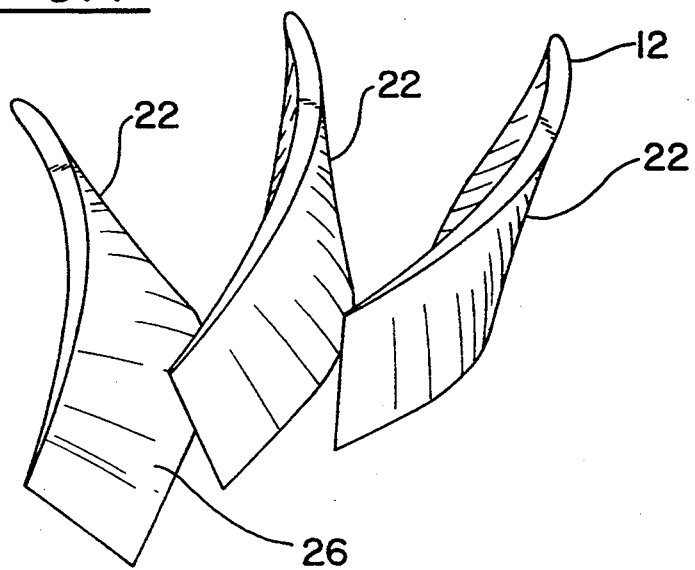
FIG. 5A is a partial developed rear view identical to FIG. 5 viewing the suction surface.

FIGS. 5 and 5A illustrate three compact radial-inflow turbine rotor blades 22 as developed to show the contour of the blades utilizing the prescribed wrap angle and leading edge relations in accordance with this invention. The three adjacent blades 22 of FIG. 5 view the blades looking at the pressure surface and FIG. 5A view the same three blades looking at the suction surface.

The advantage of the compact radial-inflow turbine designed in accordance with this invention is that it is now a useable turbine in an environments that requires higher inlet temperatures and higher rotor tip speeds for the necessary increased work capabilities while providing acceptable low cycle fatigue life. With current materials and state-of-the-art manufacturing techniques, the turbine of this invention will be capable of attaining at least 6000 cycles when operating at 2080 feet/sec. In addition the radial-inflow turbine designed in accordance with this invention would provide an improvement in rotor dynamics due to reduction in rotor size and inertia and the resultant decrease in shaft length.

Figure 7:
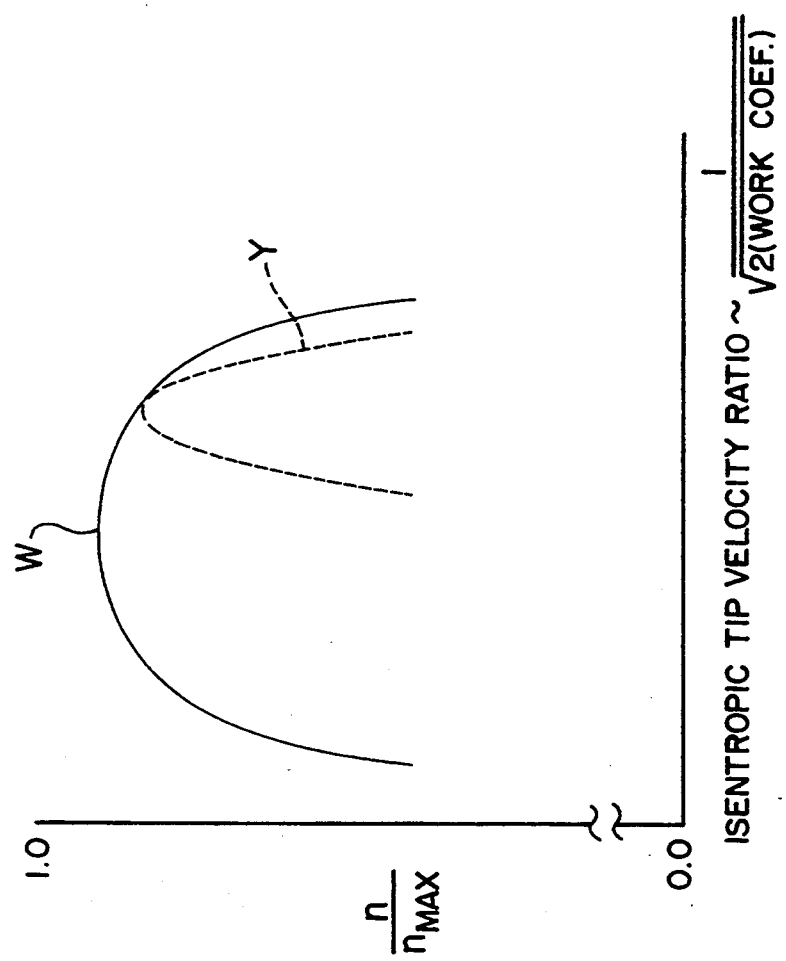
FIG. 7 is a graphical representation plotting isentropic tip velocity ratio vs. efficiency of the contoured leading edge of this invention for comparing the performance benefits with conventional leading edges.
Figure 6:
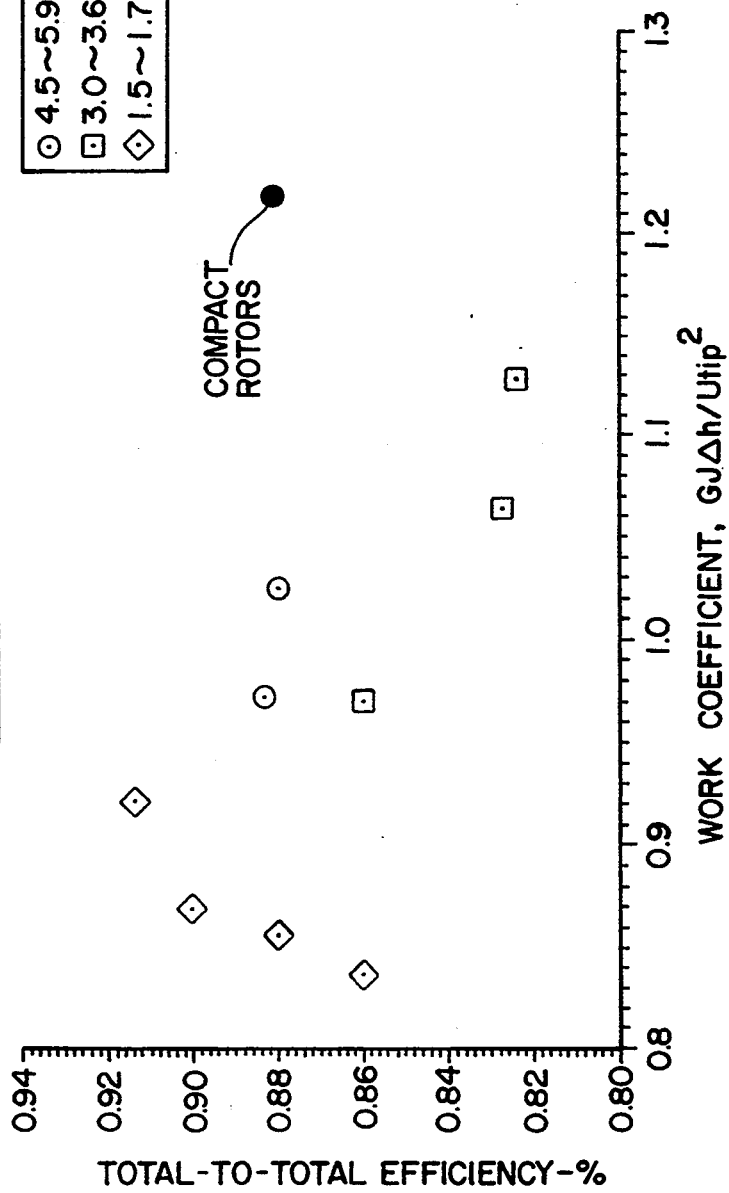
FIG. 6 is a graphical representation of aerodynamic test data plotting work coefficient vs. efficiency for comparing the invention with state-of-the-art baseline turbines.

FIGS. 6 and 7 graphically illustrate the comparison of conventional radial-inflow turbines normalized to baseline datum with the inventive radial-inflow turbine. FIG. 6 is a plot of work coefficient vs efficiency and FIG. 7 is a plot of isentropic tip velocity ratio vs. efficiency to compare the contoured leading edge shape of the inventive radial-inflow turbine to conventional radial-inflow turbines.

As noted in FIG. 6 the test results from actual aerodynamic rig testing of a conventional radial-inflow turbine operating at the three different pressure ratio classes of 4.5∼5.9$P_T/P_T$; 3.0∼3.6$P_T/P_T$; and 1.5∼1.7$P_T/P_T$ is compared with the radial-inflow turbine of this invention. It is apparent from this graph the work coefficient or energy produced by the inventive radial-inflow turbine is much greater than the conventional radial inflow turbines and operates at an efficiency level that is comparable to the conventional turbines at much lower work coefficient.

As illustrated in FIG. 7 the leading edge of the inventive turbine by leaning it and making it elliptical as described hereinabove, illustrated by curve X has a significantly extended range of isentropic tip velocity ratio and higher efficiency as compared with the conventional radial-inflow turbine as illustrated by curve Y.

Although this invention has been shown and described with respect to detailed embodiments thereof, it will be appreciated and understood by those skilled in the art that various changes in form and detail thereof may be made without departing from the spirit and scope of the claimed invention.

We claim:

1. The method of obtaining the size and inertia of a radial-inflow turbine from a blank form by performing the steps of:
    determining the optimum configuration by a fluid flow analysis calculating the wrap distribution for defining the desired operating parameters of the airfoil of the radial-inflow turbine,
    contouring the blank form to have a wrap distribution defined by the formula $\delta\theta/\delta\theta$(total) = substantially 0.0, when 0.0 is less than X and X is less than substantially 0.22135.

2. The method of obtaining the size and inertia of a radial-inflow turbine as claimed in claim 1 wherein the wrap distribution in the step of contouring the blank form is also defined by the formula $\delta\theta/\delta\theta$(total) = substantially $A + [B \times X] + [C \times X^2] + [D \times X^3] + [E \times X^4] + [F \times X^5]$ when 0.22135 is less than X, X is less than 1.00; and where, $\delta\theta/\delta\theta$ = local normalized wrap angle and A = 0.101596; B = −1.007604; C = 2.672787; D = −1.012510; E = 0.713005 and F = −0.469075; and where $\delta$ = differential; × = multiplication; and $\theta$ is a function of the wrap angle and X is a fraction of the axial chord of the airfoil of the radial-inflow turbine.

3. The method of obtaining the size and inertia of a radial-inflow turbine as claimed in claim 2 including the further step of shaping the leading edge of the airfoil of the radial-inflow turbine into the shape of an ellipse in the step of contouring.

4. The method of obtaining the size and inertia of a radial-inflow turbine of claim 3 wherein said ellipse shaped in the step of contouring has an ellipse ratio of substantially 3:1 and the leading edge of the airfoil of the radial-inflow turbine is canted from a given radial line of the airfoil by substantially 20 degrees.

5. The method of obtaining the size and inertia of a radial-inflow turbine as claimed in claim 4 wherein said ellipse is smoothly faired into the suction surface and the pressure surface of the airfoil of the radial-inflow turbine in the step of contouring.

6. The method of obtaining the size and inertia of a radial-inflow turbine as claimed in claim 1 wherein the wrap distribution also is defined by the formula $\delta\theta/\delta\theta$(total) = substantially $A + [B \times X] + [C \times X^2] + [D \times X^3] + [E \times X^4] + [F \times X_5]$, when 0.22135 is less than X and X is less than 1.00; and where, $\delta\theta/\delta\theta$ = local normalized wrap angle and A = 0.101596; B = −1.007604; C = 2.672787; D = −1.012510; E = 0.713005 and F = −0.469075; and where $\delta$ = differential; × = multiplication; and $\theta$ is a function of the wrap angle and X is a fraction of the axial chord of the airfoil of the radial-inflow turbine and the leading edge is formed into an ellipse having an ellipse ratio of substantially 3:1 and the leading edge is canted from a given radial line of said airfoil wetted surface by substantially 20 degrees and the ellipse is smoothly faired into the suction surface and the pressure surface of the radial-inflow turbine.

* * * * *